F. V. D. LONGACRE.
ELECTRIC WELDING APPARATUS.
APPLICATION FILED JULY 25, 1918.
1,344,415.
Patented June 22, 1920.
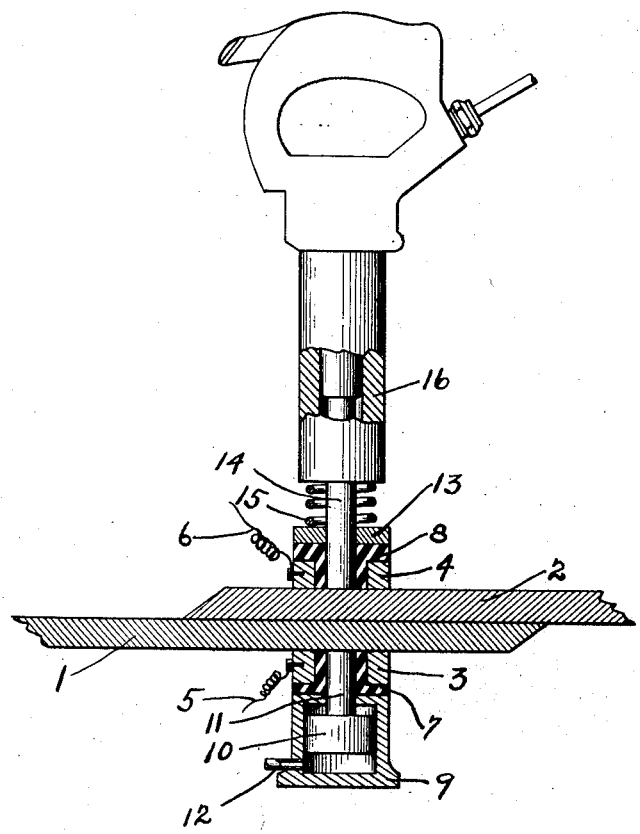

UNITED STATES PATENT OFFICE.

FREDERICK V. D. LONGACRE, OF YONKERS, NEW YORK, ASSIGNOR TO INGERSOLL-RAND COMPANY, OF JERSEY CITY, NEW JERSEY, A CORPORATION OF NEW JERSEY.

ELECTRIC WELDING APPARATUS.

1,344,415.  Specification of Letters Patent.  Patented June 22, 1920.

Application filed July 25, 1918. Serial No. 246,707.

*To all whom it may concern:*

Be it known that I, FREDERICK V. D. LONGACRE, a citizen of the United States, residing at Yonkers, in the county of Westchester and State of New York, have invented a certain new and useful Improvement in Electric Welding Apparatus, of which the following is a specification.

This invention relates to an apparatus for welding steel or other metals by electrical means, and especially to an apparatus for welding together the plates forming the sides and bottoms of steel ships.

The objects of the present invention are to improve the present methods by which the plates used in fabricating the hull of a steel vessel are joined together to form a strong, durable, and watertight seam, and to form the seam quickly, cheaply, and with inexpensive, portable and readily handled apparatus. Essentially, the present apparatus consists in improved apparatus for carrying out the process of welding plates together in overlapped position by means of heating a section of the overlapped portions of the plates by heat generated by electricity sufficiently to raise the temperature of these portions to a fusing or welding temperature and then forcing the fused sections of the plates into an intimate welding contact by means of a succession of rapid blows applied along the overlapped portions of the plates, thus forming a strong, watertight, and autogenous welded seam. This may be readily carried out by the simple apparatus here provided comprising electrodes applied to opposite surfaces of the overlapped plates and percussive elements, which may be operated by compressed air.

In addition to the application of the apparatus to welding plates, the present apparatus is adapted to be used in spot welding and is also adapted for use where a plurality of spot welds at separated points along a line are needed. The portability of the present apparatus, renders the process adaptable to be carried out in a great variety of otherwise inaccessible places and the description of the apparatus in connection with welding ship plates is to be considered as illustrative rather than restrictive.

In the annexed drawing is shown diagrammatically an apparatus for carrying out the aforesaid process, some of the parts being shown in section.

Referring more particularly to this drawing, the plates 1 and 2 are shown in overlapped position and have an electrode 3 applied to one outer surface and another electrode 4 applied to the opposite surface of the other plate. A heavy current of electricity, which may be either direct or alternating, is led to these electrodes through electric conduits 5 and 6. Sufficient pressure is applied against these electrodes 3 and 4 to form an electric contact between themselves and the two plates, thus permitting the current to flow directly through the overlapped portions of the plates. The resistance of the metal forming the plates is far greater than that of the remainder of the electric circuit, so that an intense heat is almost immediately developed through the two plates directly beneath the electrodes 3 and 4 to such a degree that the parts are fused and in condition to be readily welded. The heating of the portions to be welded may also be accomplished by an electric arc formed between an electrode held a slight distance from one of the sections to be welded and the metal itself.

In order to accomplish this welding expeditiously and thoroughly, additional pressure is necessary. According to the present invention it is contemplated to supply this pressure by readily portable and easily handled means, by which a succession of rapidly delivered blows is applied against at least one of the plates.

Against one of the overlapped plates and preferably in alinement with one of the electrodes, a pneumatic holder-on is provided, in the drawings this being shown at 9. This may be held in position by any ordinary mechanical means, which, however, it is not thought necessary to describe, and a fluid conduit 12 is provided to supply this holder-on with fluid pressure to force the piston 10 upwardly in its cylinder, a projection of the piston 11 extending from the holder-on 9 through the electrode 3 and pressing directly against the plate 1. Between the electrode 3 and holder-on 9 an insulator 7 is provided, the means for insulating the holder-on 9 from its support not being shown.

Directly opposite the electrode 3 and preferably centrally located with respect to the electrode 4 a pneumatic tool 16 is used, which may be of any well known type having a hammer operating within the cylinder provided in the pneumatic tool 16. Extending forwardly from the cylinder of the pneumatic tool 16 and separated from the hammer of the tool is an extension or shank 14 directly engaging the plate 2. An insulator 8 is provided surrounding the shank 14 and held centrally of the electrode 4. Resting against the insulator 8 is a collar 13, back of which extends a compressive spring 15 bearing against the front end of the pneumatic tool 16.

From the above description of the apparatus it will be seen that in addition to means for holding the electrodes 3 and 4 in position fluid pressure operated means are provided for rapidly hammering with a high degree of pressure applied by a rapid succession of relatively light blows against the portions of the overlapped plates 1 and 2 which have been brought to a fusing or welding temperature. The pneumatic tool 16 and electrode 4 are mounted, as it will be seen, so that they may be readily operated by a workman and applied against the face of the plate 2 with sufficient pressure to maintain an electric contact between the plate 2 and electrode 4 and also with sufficient pressure to provide a heavy blow of the shank 14 against the fused portions of this plate. Upon the opposite plate 1, on which side the electrode 3 is held, any well known mechanical means may be provided to support the holder-on in position, means being provided to readily adjust the position of the holder-on 9 and electrode 3 along the seam desired to be formed.

If desired, another pneumatic tool similar to that shown at 16 may be substituted for the holder-on 9. In that case the two pneumatic tools are manually held and moved along opposite sides of the plates as the temperature of the plates in the parts operated upon is brought up to fusing or welding temperature.

The present invention is equally well adapted for use in calking the seams of plates or other metal sections. In this case either the electric arc or resistance of the metal may be utilized to heat the calking seam and then the portions may be hammered into an intimate welding contact.

It is to be understood that the present showing and description disclose only certain specific applications and modifications of the present invention and that further applications and modifications of the same are included within the spirit and scope thereof, as expressed in the appended claims.

What I claim is:

1. In an apparatus for welding metal plates by the simultaneous fusing of the metal thereof and the delivery of a rapid succession of blows thereon, a pair of electrodes adapted to be forced directly against opposite sides of overlapped plates, a holder-on disposed against the electrode upon one of said overlapped plates, said holder-on comprising a plunger, and means for maintaining said plunger under heavy pressure against said plate, insulating means interposed between said electrode and said plunger, a cylindrical shank disposed on the opposite side of said plates surrounded by the electrode on said side, insulating means between said shank and the electrode surrounding it, a cover plate placed over said electrode, means adapted to deliver a rapid succession of relatively light blows against a surface of said overlapped plates, and means for conducting electric current to said electrodes to heat the overlapped portions of said plates between the terminals of said electrodes to a high welding temperature by the resistance to the flow of electric current through said overlapped - plate - portions, whereby the metal is simultaneously fused and forced into intimate welding contact by the blows of said fluid operated hammer.

2. In an apparatus for welding metal plates by the simultaneous fusing of the metal thereof and the delivery of a rapid succession of blows thereon, a pair of cylindrical electrodes adapted to be forced directly against opposite sides of overlapped plates, a pneumatically actuated holder-on disposed against the electrode upon one of said overlapped plates, said holder-on comprising a cylinder, a piston in said cylinder having a plunger projecting through said cylinder and means for admitting fluid pressure to said cylinder to maintain said plunger under heavy pressure against said plate, insulating means interposed between said electrode and said plunger and between said electrode and said cylinder, a cylindrical shank disposed on the opposite side of said plates in direct alinement with said holder-on plunger on the opposite side of said plates, insulating means between said shank and the electrode, a circular cover plate placed over said electrode, insulating material between said cover plate and electrode, a fluid operated hammer engaging the free end of said shank, and a compressive spring between the end of said fluid operated hammer and said cover plate, said fluid operated hammer being adapted to be reciprocated to deliver a rapid succession of relatively light blows against a surface of said overlapped plates, and means for conducting electric current to said electrodes to heat the overlapped portions of said plates between the terminals of said electrodes to a high welding temperature by the resistance to the flow of electric current through said overlapped-plate-portions, whereby the metal is simultaneously fused and forced into intimate welding contact by the blows of said fluid operated hammer.

In testimony whereof, I have hereunto set my hand.

FREDERICK V. D. LONGACRE.